Sept. 7, 1943.  W. P. STUCKERT ET AL  2,329,164
MANDREL DRIVE APPARATUS
Filed April 25, 1941  3 Sheets-Sheet 1

William P. Stuckert,
Harold H. Snyder,
INVENTORS

BY Lawrence Burns,
ATTORNEY

Sept. 7, 1943.  W. P. STUCKERT ET AL  2,329,164
MANDREL DRIVE APPARATUS
Filed April 25, 1941    3 Sheets-Sheet 2
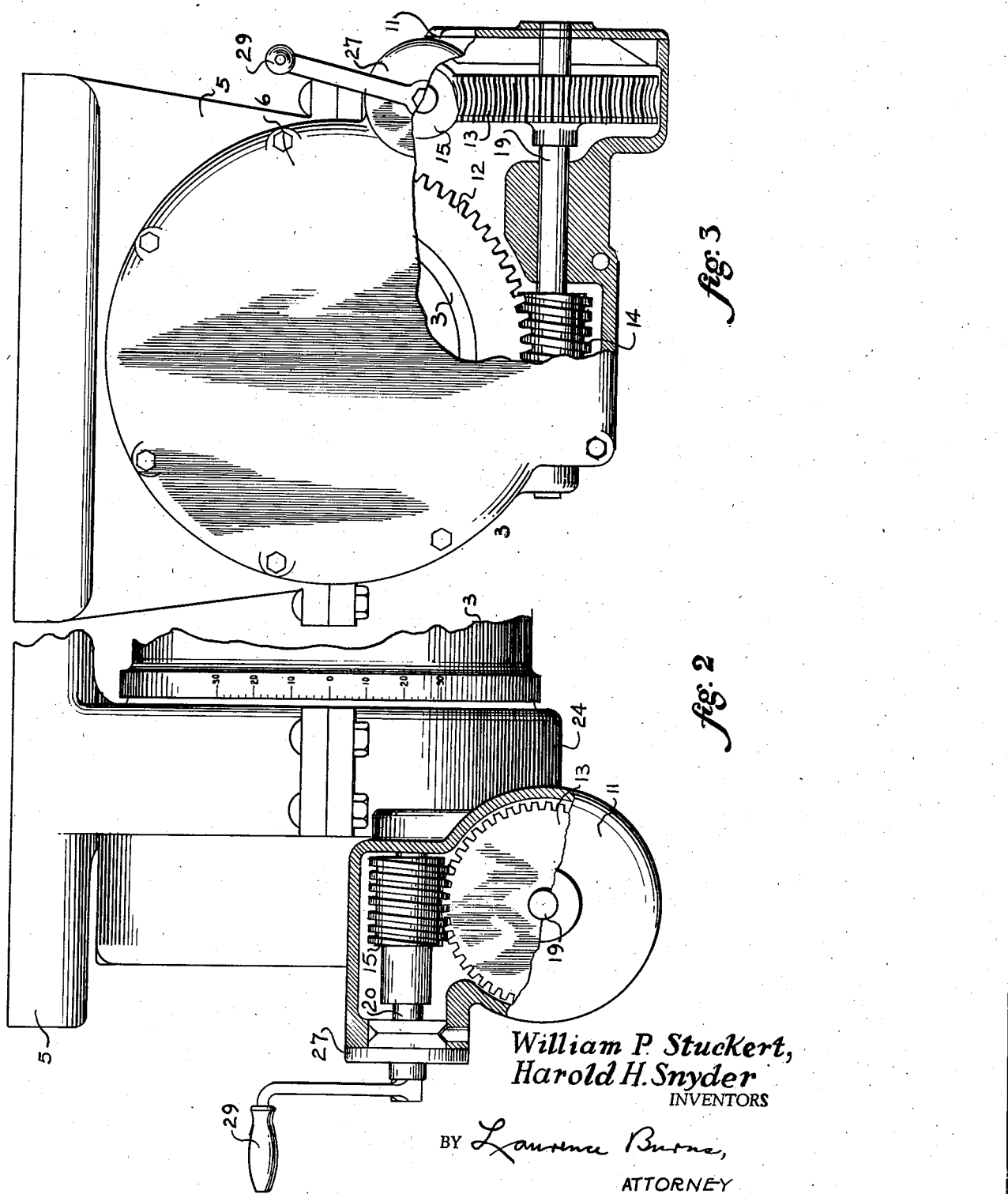
William P. Stuckert,
Harold H. Snyder
INVENTORS
BY Lawrence Burns,
ATTORNEY Patented Sept. 7, 1943

2,329,164

UNITED STATES PATENT OFFICE 2,329,164

MANDREL DRIVE APPARATUS

William P. Stuckert, Marblehead, and Harold H. Snyder, Lynn, Mass., assignors to Sylvania Electric Products Inc., a corporation of Massachusetts Application April 25, 1941, Serial No. 390,350

2 Claims. (Cl. 49—17)

This invention relates to machinery for the manufacture of glass and more particularly to the mandrel drive and the driving and adjusting mechanism therefor.

An object of this invention is to provide a mandrel adjusting and drive unit which can be adjusted and regulated without having to stop operations and without injuriously affecting the quality of the glass flowing from the mandrel.

Another object is to provide a mandrel adjusting and drive unit which can be adjusted accurately and with precision as well as with rapidity.

A further object is to provide a mandrel adjusting and drive unit which possesses an adaptability covering a wide range, not only of the pitch of the mandrel but also of the elevation of the mandrel assembly.

Further objects, advantages and features will be apparent from the following specification taken in conjunction with the accompanying drawings in which:

Figure 2 is a side elevational view partly in section of the mandrel pitch adjusting assembly.

Figure 3 is an end view partly in section of the mandrel pitch adjusting assembly.

Similar reference characters refer to similar parts in the several views of the drawings.

In the manufacture of tubular glass in which the molten glass is caused to flow over a ceramic mandrel, the wall thickness of the tubular glass being drawn is governed by the speed with which the glass flows off the mandrel. However, the control being exercised by the constancy of the speed of the mandrel is accurate only so long as the temperature of the molten glass, as it hits and flows off the mandrel remains constant. Due to the difficulty of maintaining the molten glass at an exact uniform temperature, some means must be devised to compensate for an increase or decrease in the temperature of the molten glass in order that the glass may flow off the mandrel in a uniform manner.

When the molten glass tends to sag and collect along the bottom of the mandrel so that there is a lack of uniformity in the wall thickness of the tubular glass flowing off the end of the mandrel, then the mandrel should be speeded up so that it will turn more revolutions per minute and thereby obviate this condition. For this reason, I have employed a variable speed control on the mechanism for driving the mandrel of this machine.

Similarly, if the temperature of the glass were too high or if, for any reason, the glass were flowing off the end of the mandrel at too great a speed, some means of accurately exercising control should be available. On this machine the pitch of the mandrel can be rapidly changed with a high degree of accuracy and a smoothness of operation not found in other mandrel drive and adjusting units.

Not only is it desirable to be able to exercise a ready and accurate control over the adjustability of the mandrel in a vertical manner, i. e. the adjustability of the pitch thereof, but it is also desirable to be able to readily and accurately adjust the position of the mandrel in a horizontal plane. This is accomplished on this machine by reason of the manner in which the mandrel is locked in the water-cooled jacket. This adjustment enables the attainment of a wider range of adaptability of the position of the mandrel to cope with varying working conditions under which the mandrel may be forced to operate.

In this machine, not only is the mandrel capable of adjustment in a horizontal and a vertical plane but the entire mandrel drive unit is adjustably mounted to permit the raising and lowering of the entire unit. This adjustability is also accomplished in a manner to provide an accurate adjustment.

Thus it may be seen that this machine embodies several adjusting features for a mandrel drive unit. No one of these adjustments requires a shut-down or a necessary drop in efficiency when they are being made. Not only can normal operations continue while these adjustments are being made, but the means provided therefor are such as to insure an accurate adjustment speedily accomplished, with no strain being placed on any other part of the machinery and no other part of the machinery being thrown out of proper alignment by the adjustment.

Figure 1:
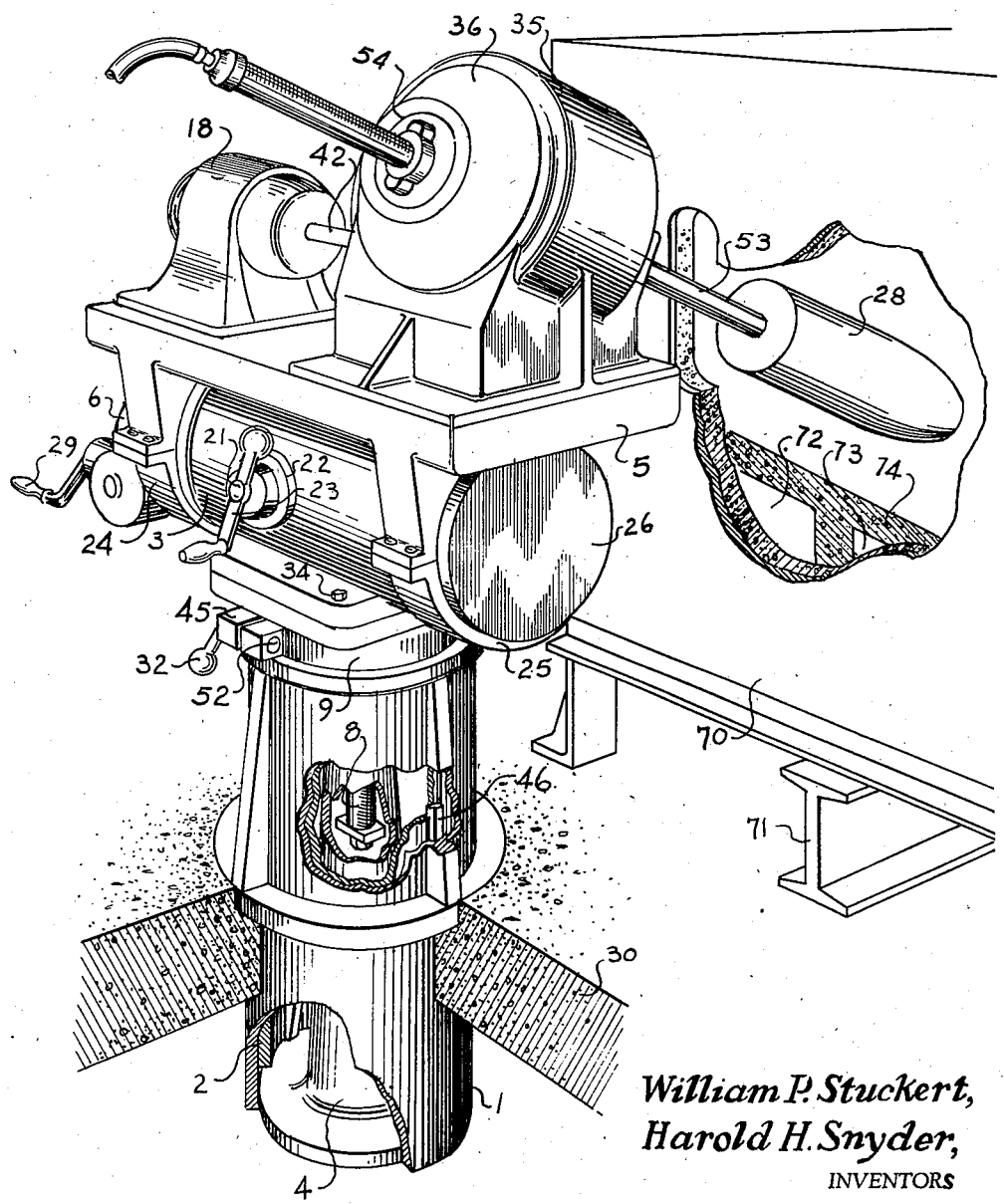
Figure 1 is a projection in partial section of the mandrel drive adjusting unit and furnace.

In Figure 1, the ceramic mandrel 28 is fitted on the end of the mandrel bar 53 which is made of a high temperature heat-resisting alloy. The variable speed drive 18 and the water-cooled drive housing 35 through which the mandrel bar 53 is held are mounted on top of the support table 5. This support table 5 is mounted over the horizontal support 3 through bearings in the support table flange cap 24 and the support table cap 25 which are attached to the lower extremities of the support table 5 and which encircle the horizontal support 3 near the ends thereof. The horizontal support cap 26 caps the tubular horizontal support 3 at one end while the end cover 6 caps it at the other end. It is through this other end that the means for controlling the pitch of the mandrel is located. This control is exercised through the mandrel pitch adjusting handle 29.

The column support 1 provides the main support for this machine. Its lower extremity is sunk in the concrete 30 to insure adequate support and proper balance for the various parts of the machine regardless of the angle to which some of the elements may be adjusted. The adjusting column 2, within the column support 1, has the horizontal support 3 bolted to the top thereof through the bolts 34. The adjustment to raise or lower the adjusting column 2 is made through the adjusting handle 23 and is accomplished through a bevel gear and bevel pinion operating on the adjusting screw 8 within the adjusting screw column 4. The column clamp ring 9 with the lugs 45 thereon serve as a means of locking the adjusting column 2 after it has been elevated to the desired position. This locking takes place through the column lock lever 32 and the column clamping screw 52 fitted in the lugs 45. A key way, with the key 46 therein, prevents the adjusting column 2 from turning in a spiral manner when it is being raised or lowered through the adjusting screw 8.

Figure 1 also shows how the mandrel drive unit is independently mounted from the remainder of the glass forming apparatus. Thus this mandrel drive mechanism differs from that shown in Patent 1,219,709 issued to Danner. In that patent the mandrel drive mechanism is shown as directly connected to the remainder of the glass forming apparatus while the mandrel drive in this application is independently mounted therefrom. In that patent the mandrel was driven by a chain and sprocket mechanism whereas the mandrel in this application is driven much more smoothly and evenly through a worm and gear mechanism, thus lending itself to wider ranges of adaptability with respect to speed without imparing the quality of the glass being drawn.

The furnace 70 is mounted on the supports 71. The muffled heating chamber may be divided into two portions 72 and 73 due to the desirability of having two distinct temperature controls on different points of the revolving mandrel. The mandrel wall or housing 74 is arranged within the furnace 70 to prevent flames in the chambers 72 and 73 from direct contact with the glass as it flows onto and down the mandrel. The opening in the wall of the furnace 70 through which the mandrel bar 53 extends may be closed off, to prevent heat from the furnace from overheating the water-cooled housing through which the mandrel is driven, by a removable horseshoe shaped element through which the mandrel bar 53 may be moved in a vertical plane to permit the adjustment of the angular disposition of the mandrel.

The mandrel may be changed and a different one substituted therefor by disconnecting the key on the mandrel bar removing the support wheel and the air connection, and then dropping the mandrel forward, removing the same through the front of the furnace. This is more completely described in the description of Figure 4.

Figures 2 and 3 show the mechanism employed for adjusting the pitch of the mandrel. In Figure 2, the mandrel pitch adjusting handle 29 is attached to the outer end of the reduction worm shaft 20. The reduction worm 15 is attached to the inner end of the worm shaft 20 and is meshed with the worm gear 13. This worm gear 13 moves about the worm shaft 19. As shown in Figure 3, the worm 14 on the shaft 19 is meshed with the worm gear 12. This worm gear 12 is fixed to the horizontal support 3 by any suitable means, such as bolts, not shown. Thus when the mandrel pitch adjusting handle 29 is turned, the reduction worm shaft 20 is turned thereby. This causes the worm 15 and the worm gear 13 to turn. The movement of the worm gear 13 is transmitted through the worm shaft 19 to the worm 14. Since the worm gear 12 is fixed to the horizontal support 3 the movement of the worm 14 will cause the table support 5 to move about the worm gear 12.

The end cover 6, which is bolted to the lower extremity of the support table 5 and the support table flange cap 24, serves as a housing in which the worm gear 12 and the worm 14 are housed. The end cover plate 11 caps the worm gear 13, and the reduction worm cap 27 caps the worm 15 and the reduction worm shaft 20.

As is shown in Figure 2, the rearward extremity of the horizontal support 3, adjacent the lower extremity of the support table 5 and the support table flange cap 24, is graduated to enable the accurate calculation of the extent to which the table 5 is moved and hence the extent to which the pitch of the mandrel has been altered. In this way, the increase or decrease of the pitch over or under a certain given pitch may readily be calculated.

Figure 4:
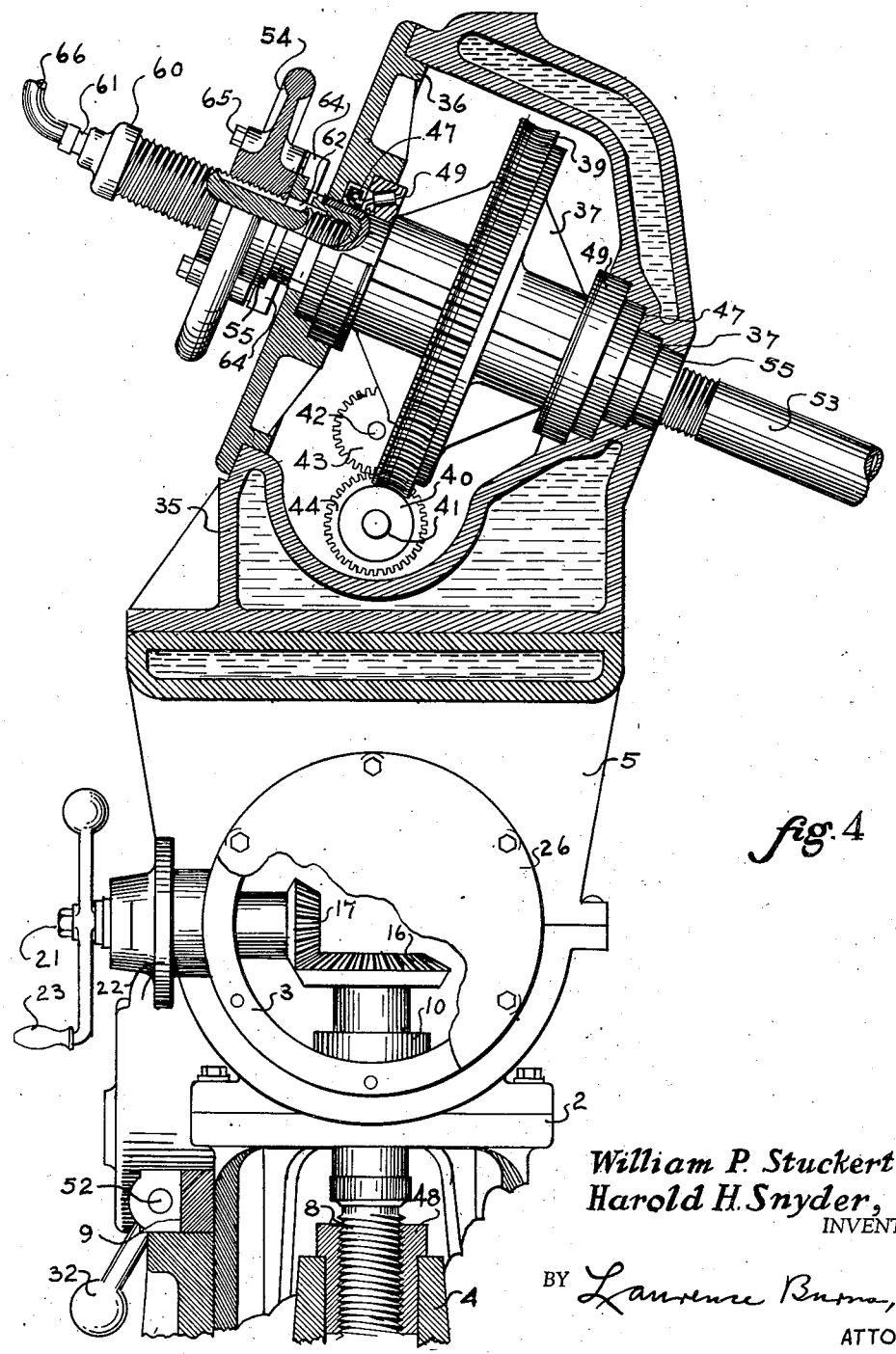
Figure 4 is a section of the mandrel drive and adjusting unit showing the means for raising and lowering the entire assembly, the means through which the mandrel is driven and the means for adjusting the longitudinal extension of the mandrel bar.

Figure 4 shows the manner in which the mandrel drive assembly may be raised or lowered through the adjusting column 2, the manner in which the mandrel bar 53 is driven, and the manner in which the mandrel bar 53 may be moved in a longitudinal manner in and out of the drive housing 35.

The mandrel drive assembly, mounted on top of the adjusting column 2 is adjusted through the adjusting screw 8. This screw 8 is located within the adjusting screw column 4. The top of this column 4 is capped by the nut 48 through which the adjusting screw 8 operates. The upper portion of the adjusting screw 8 projects up through the bottom of the housing support 3. The top of the adjusting screw 8 is capped with the bevel gear 16. The bevel pinion shaft 21 with the bevel pinion 17 on the inner end thereof projects through the side of the horizontal support 3 in a manner such as to permit the bevel pinion 17 to mesh with the bevel gear 16. The bevel pinion cap 22 caps the face of the horizontal support 3 through which the bevel pinion shaft 21 projects.

Thus when the adjusting handle 23 which is located on the outer end of the bevel pinion shaft 21 is turned to the right or to the left, the entire mandrel drive assembly will be raised or lowered by the raising or lowering of the adjusting column 2 on which the entire assembly is mounted. The turning of the handle 23 will turn the bevel pinion shaft 21 and hence the bevel pinion 17 and the bevel gear 16. The turning of the bevel gear 16 which caps the adjusting screw 8 will turn the screw 8 which is threaded in the nut

48. The movement of the screw 8 will cause the entire mandrel drive assembly to be raised or lowered, the movement of the screw 8 being transmitted to the entire assembly through the column flanges 10 which establish a bearing surface contact with the adjusting screw 8.

To insure the positive holding of the adjusting column 2 in the position to which it has been moved as the result of an adjustment, the column clamp ring 9 which encircles the column 2 flush with the top of the column support 1, is tightened by turning the column clamping screw 52 through the column lock lever 32.

As was pointed out in the description of Figure 1, the mandrel bar 53 is driven by the variable speed drive 18 through the counter-drive shaft 42. As is shown in this figure, Figure 4, the counter drive shaft 42 drives the counter-drive gear 43 which is meshed with the worm drive shaft gear 44. The motion of the worm drive shaft gear 44 is transmitted through the worm drive shaft 41 to the drive worm 40 which is in turn meshed with the drive worm gear 39 on the drive worm support 37.

The drive worm support 37 is fitted in the drive housing 35 through the bearings 49. The oil seals 47 serve to lubricate the bearings 49. The mandrel bar sleeve 55 encircles that portion of the mandrel bar 53 which is located within the drive housing 35.

The rearward extension of the mandrel bar 53 is threaded to permit longitudinal adjustment of the bar through the mandrel bar handwheel 54. The threaded mandrel bar 53 also has a keyway therein, in which the sleeve key 62 in the mandrel bar sleeve 55 is located. Not only is the mandrel bar hand-wheel 54 locked through the sleeve key 62 but further assurance is had that it will maintain its position once it is adjusted by reason of the handwheel clamps 64 which lock the wheel 54 to the mandrel bar sleeve 55. Thus, in order to make an adjustment through the mandrel bar handwheel 54, the handwheel clamps 64 must first be released through the backing off of the clamp screws 65. Air is introduced into the mandrel bar 53 from the air line 66 through the universal joint 61 and the mandrel bar air connection nut 60.

What I claim is:

1. A mandrel drive unit comprising: a vertically disposed cylindrical support; a cylindrical sleeve mounted in said support for vertical adjustment with respect thereto; means carried by said cylindrical support permitting locking said sleeve against vertical adjustment; a horizontally disposed cylindrical bearing member mounted on said sleeve and above said support; means extending within said bearing, for vertically adjusting said sleeve and consequently said bearing; a table mounted for pivotal movement, in a vertical plane, about said bearing as a horizontal pivot; means carried by said table for pivoting said table about said bearing; a water-cooled housing mounted on said table; a mandrel bar extending through said housing; a mandrel attached to said bar; drive means mounted on said table for rotating said mandrel bar; and means for adjusting the length of said bar in its extension from said water cooled housing.

2. A mandrel drive unit comprising: a vertically disposed cylindrical support; a cylindrical sleeve mounted in said support for vertical adjustment with respect thereto; a horizontally disposed cylindrical bearing member mounted on said sleeve and above said support; means for vertically adjusting said sleeve; means carried by said cylindrical support permitting locking of said sleeve in any vertical position to which it may be adjusted; a table mounted for pivotal movement about said bearing member as a horizontal pivot and having its longitudinal axis parallel to the longitudinal axis of said bearing member; means carried by said table for pivoting said table about said bearing; a compact water-cooled housing mounted on said table above and close to said bearing; a mandrel attached to said bar; drive means mounted on said table above and close to said bearing for rotating said mandrel bar; and means for adjusting the length of said bar in its extension from said water-cooled housing.

WILLIAM P. STUCKERT.
HAROLD H. SNYDER.